US008942318B1

(12) United States Patent
Pick et al.

(10) Patent No.: US 8,942,318 B1
(45) Date of Patent: *Jan. 27, 2015

(54) METHOD AND APPARATUS OF CROSS-CORRELATION

(71) Applicant: Marvell World Trade Ltd., St. Michael (BB)

(72) Inventors: Kobby Pick, Modiin (IL); Yona Perets, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,308

(22) Filed: Oct. 22, 2013

Related U.S. Application Data

(63) Continuation of application No. 13/599,824, filed on Aug. 30, 2012, now Pat. No. 8,576,954, which is a continuation of application No. 12/268,973, filed on Nov. 11, 2008, now Pat. No. 8,259,851, which is a continuation of application No. 11/624,550, filed on Jan. 18, 2007, now Pat. No. 7,466,769, which is a continuation of application No. 10/254,974, filed on Sep. 26, 2002, now Pat. No. 7,203,253.

(51) Int. Cl.
*H03D 3/22* (2006.01)
*H04L 27/22* (2006.01)

(52) U.S. Cl.
CPC .................................. *H04L 27/22* (2013.01)
USPC .......................................... 375/329; 375/322

(58) Field of Classification Search
CPC ........ H04B 1/707; H04B 1/709; H04L 23/02; H04L 27/22

USPC .................. 375/329, 332, 279, 322; 455/205
See application file for complete search history.

(56) References Cited

U.S. PATENT DOCUMENTS

| 5,305,349 | A | | 4/1994 | Dent | |
|---|---|---|---|---|---|
| 5,574,399 | A | * | 11/1996 | Oura et al. | 329/306 |
| 5,619,507 | A | | 4/1997 | Tsuda | |
| 6,034,635 | A | | 3/2000 | Gilhousen | |
| 6,236,687 | B1 | | 5/2001 | Caso et al. | |
| 6,351,498 | B1 | * | 2/2002 | Yamao et al. | 375/260 |
| 6,363,100 | B1 | * | 3/2002 | Ohki et al. | 375/141 |
| 6,363,106 | B1 | * | 3/2002 | Popovic et al. | 375/150 |

(Continued)

FOREIGN PATENT DOCUMENTS

| WO | WO0060738 A1 | 10/2000 |
|---|---|---|
| WO | WO0103294 A1 | 1/2001 |

OTHER PUBLICATIONS

"Cross Correlation",Retrieved on Dec. 14, 2011 at <<http://en.wikipedia.org/wiki/Cross_correlation>>, 4 pgs.

Dao, "Specific Arithmetics in Radices +/−4", In the Proceedings of the Eighteenth International Symposium on Multiple-Valued Logic, 1988, pp. 134-139.

(Continued)

*Primary Examiner* — Dhaval Patel
*Assistant Examiner* — Helene Tayong

(57) ABSTRACT

Briefly, a method and apparatus to calculate cross-correlation values of complex binary sequences are provided. The apparatus may include a transformation unit and a cross-correlator. The cross-correlator may include a cross-correlation controller to provide, based on a type bit and a sign bit, a real component and/or an imaginary component of signals of complex binary sequences to a real accumulator and/or to an imaginary accumulator.

15 Claims, 2 Drawing Sheets

(56) References Cited

U.S. PATENT DOCUMENTS

| | | |
|---|---|---|
| 6,404,821 B1 | 6/2002 | Dent |
| 6,473,506 B1 * | 10/2002 | Hook et al. .................. 379/279 |
| 6,563,858 B1 | 5/2003 | Fakatselis et al. |
| 6,625,239 B1 * | 9/2003 | Shiraishi et al. ............. 375/354 |
| 7,457,385 B2 * | 11/2008 | Feher ............................ 375/347 |
| 2002/0095640 A1 | 7/2002 | Arad et al. |
| 2003/0067962 A1 | 4/2003 | Yellin |

OTHER PUBLICATIONS

Jamil, "The Complex Binary Number System", IEEE Potentials, vol. 20, Issue 5, 2001, pp. 39-41.

Jamil, et al., "Towards Implementation of a Binary Number System for Complex Numbers", In the Proceedings of the IEEE Southeastcon, 2000, pp. 268-274.

International Search Report of International Application No. PCT/US03/22500, dated Dec. 3, 2003.

* cited by examiner

METHOD AND APPARATUS OF CROSS-CORRELATION

CROSS-REFERENCES TO RELATED APPLICATIONS

The present disclosure is a continuation of and claims priority to U.S. patent application Ser. No. 13/599,824, filed Aug. 30, 2012, now U.S. Pat. No. 8,576,954, issued Nov. 5, 2013, which is a continuation of and claims priority to U.S. patent application Ser. No. 12/268,973, filed Nov. 11, 2008, now U.S. Pat. No. 8,259,851, issued Sep. 4, 2012, which is a continuation of and claims priority to U.S. patent application Ser. No. 11/624,550, filed Jan. 18, 2007, now U.S. Pat. No. 7,466,769, issued Dec. 16, 2008, which is a continuation of and claims priority to U.S. patent application Ser. No. 10/254,974, filed Sep. 26, 2002, now U.S. Pat. No. 7,203,253, issued Apr. 10, 2007, which are incorporated herein by reference.

BACKGROUND OF THE INVENTION

In wireless communication systems such as spread spectrum cellular communication systems, cross-correlators may be used to perform cross correlation between streams of sequences of spread spectrum signals. For example, in cellular wideband code division multiple access (WCDMA) systems a spread spectrum signal may include a coding sequence, for example, a pseudo-random code. In cellular wideband code division multiple access (WCDMA) systems, the pseudo-random code may be an M-sequence or a Gold Sequence which has good "noise like" properties and is simple to construct. Furthermore, the sequences of the spread spectrum signal may be the product of a 64 chip Walsh code (aimed at separating up to 64 different users per base) and a periodic pseudorandom noise (PN) sequence (aimed at separating the different bases).

Cross-correlators may be used to perform cross-correlation between the streams of sequences. However, existing hardware implementations of cross-correlators may include a large number of components and may consume large currents.

Thus, there is a need for hardware and/or software implementations for calculating cross-correlation values to mitigate the above-described disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
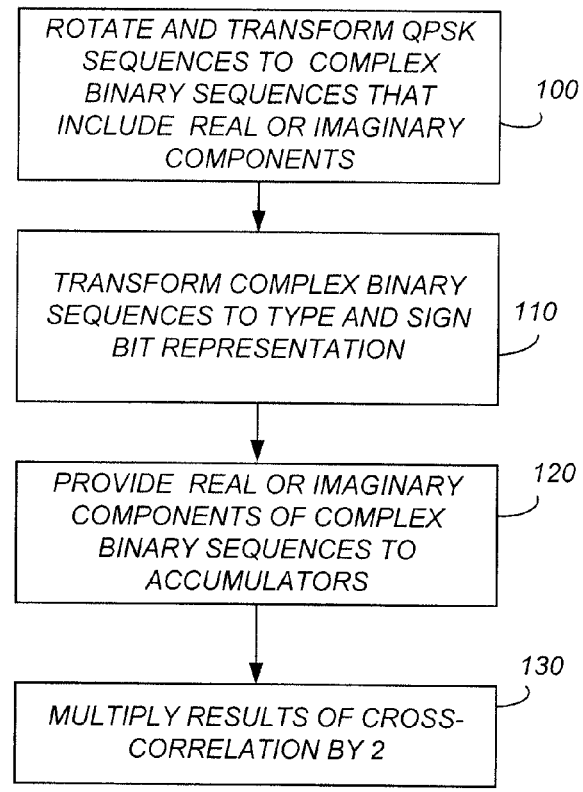
FIG. 1 is a schematic flowchart depicting a method according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in variety of applications. Although the present invention is not limited in this respect, the circuits and techniques disclosed herein may be used in many apparatuses such as receivers of a radio system. Receivers intended to be included within the scope of the present invention include, by a way of example only, cellular radiotelephone receivers, spread spectrum receivers, digital system receivers and a like.

Types of cellular radiotelephone receivers intended to be within the scope of the present invention include, although not limited to, Code Division Multiple Access (CDMA), CDMA 2000 and wideband CDMA (WCDMA) cellular radiotelephone, receivers for receiving spread spectrum signals, and the like.

Turning to FIG. 1, a method of cross-correlating between at least two signals of complex binary sequences according to an embodiment of the invention is shown. Although the scope of the present invention is not limited in this respect, the method may begin with transforming quadrature phase shift keying (QPSK) sequences into two signals of complex binary sequences (block 100), if desired.

Although the scope of the present invention is not limited in this respect, the transforming of QPSK sequences into two signals of complex binary sequences may be demonstrated by the following equations. The following equation may be used to calculate a complex cross correlation between two QPSK complex sequences:

$$CC(n, d) = \sum_{i=0}^{L-1} S_1(n+i) \cdot S_2^*(n+i+d) \quad \text{Equation 1}$$

wherein:

$S_1(n)$, $S_2(n)$ are two signals of complex sequences with given complex values of $\pm A \pm j \cdot A$;

L is the number of cross correlation terms; and d is the delay between the two sequences.

Equation 1 may be further developed in the following manner:

$$CC(n, d) = \sum_{i=0}^{L-1} S_1(n+i) \cdot S_2^*(n+i+d) = 2 \cdot \sum_{i=0}^{L-1} \tilde{S}_1(n+i) \cdot \tilde{S}_2^*(n+i+d) \quad \text{Equation 2}$$

As demonstrated by Equation 2, the cross correlation sequences $S_1(n)$, $S_2(n)$ may be replaced by two signals of complex binary sequences $\tilde{S}_1(n)$, $\tilde{S}_2(n)$. The content of the signals $\tilde{S}_1(n)$, $\tilde{S}_2(n)$ may be depicted by the following equation:

$$\tilde{S}_{1I}(n) = (S_{1I}(N) + S_{1Q}(n))/2$$
$$\tilde{S}_{1Q}(n) = (-S_{1I}(n) + S_{1Q}(n))/2$$
$$\tilde{S}_{2I}(n) = (S_{2I}(n) + S_{2Q}(n))/2$$
$$\tilde{S}_{2Q}(n) = (-S_{2I}(n) + S_{2Q}(n))/2 \quad \text{Equation 3}$$

wherein notation I may denote an in-phase component of signals $\tilde{S}_1(n)$, $\tilde{S}_2(n)$ and notation Q may denote a quadrature phase component of signals $\tilde{S}_1(n)$, $\tilde{S}_2(n)$. Furthermore, it should be known to one skilled in the art that notation I may represent a real component of signals $\tilde{S}_1(n)$, $\tilde{S}_2(n)$, and notation Q may represent an imaginary component of signals $\tilde{S}_1(n)$, $\tilde{S}_2(n)$ signals.

Although the scope of the present invention is not limited in this respect, transformation of QPSK sequences to complex binary sequences may be performed by $\pm(\pi/4)$ phase rotation of QPSK sequences, as described below with reference to FIG. 2.

Figure 2:
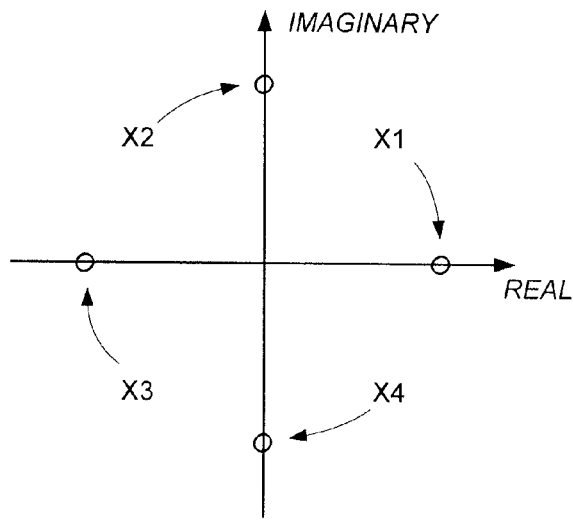
FIG. 2 is a schematic illustration helpful in understanding a phase rotation according to some exemplary embodiments of the present invention.

Turning to FIG. 2, an illustration helpful for describing rotation of QPSK sequences according to embodiments of the present invention is shown. Although the scope of the present invention is not limited in this respect, FIG. 2 shows $\pm(\pi/4)$ rotations of QPSK sequence values. However, in other embodiment of the present invention, $\pm(\pi/4)$ rotation of 16 quadrature amplitude modulation (QAM) sequences or other suitable forms of sequence rotation may be performed, if desired. More practically, QPSK values X1, X2, X3, and X4 may be rotated to be on either an imaginary axis or a real axis. For example, X1 may be rotated to be on the real axis, X2 may be rotated to be on the imaginary axis, X3 may be rotated to be on the real axis and X4 may be rotated to be on the imaginary axis. It should be understood to one skilled in the art that rotating of QPSK sequence values may be analogues to transforming of QPSK sequences to real or imaginary components of a complex binary sequence, if desired.

Furthermore, the rotation may be utilized to simplify the cross correlation calculations, as described by the following equation:

As may be seen in Equation 4, the complex binary sequence signals $\tilde{S}_1(n)$, $\tilde{S}_2(n)$ are either purely real or purely imaginary, which may reduce the number of real and/or imaginary multiplications required for performing complex multiplication from four to one.

Turning back to FIG. 1, the method may continue with transforming a complex sequence into a sign bit and a type bit representation (block 110). For example, as shown in FIG. 2, a rotation and transformation of the value X1 may generate a sign bit "plus" and a type bit "real". Furthermore, a rotation and transformation of the sequence X4 may generate a sign bit "minus" and a type bit "imaginary". Although the present invention is not limited in this respect, rotation and transformation of sequences may be performed in single operation, if desired. However, in other embodiments of the invention rotation and transformation may be performed by separate operations. In addition, in one embodiment of the present invention, the type bit and the sign bit may be used to provide a real component and/or an imaginary component of the complex binary sequences to real and/or imaginary accumulator, respectively (block 120).

Although the scope of the present invention is not limited in this respect, at least two accumulators may be used, a first accumulator may be used to output a real component of cross-correlation results and the second accumulator may be used to output an imaginary component of cross-correlation results.

The cross-correlation results may be multiplied by two, as demonstrated by Equation 2 (block 130). It should be understood by one skilled in the art that the above described method may be implemented by hardware and/or by software. An example of an embodiment of the present invention that may use a combination of hardware and software will now be described.

Figure 3:
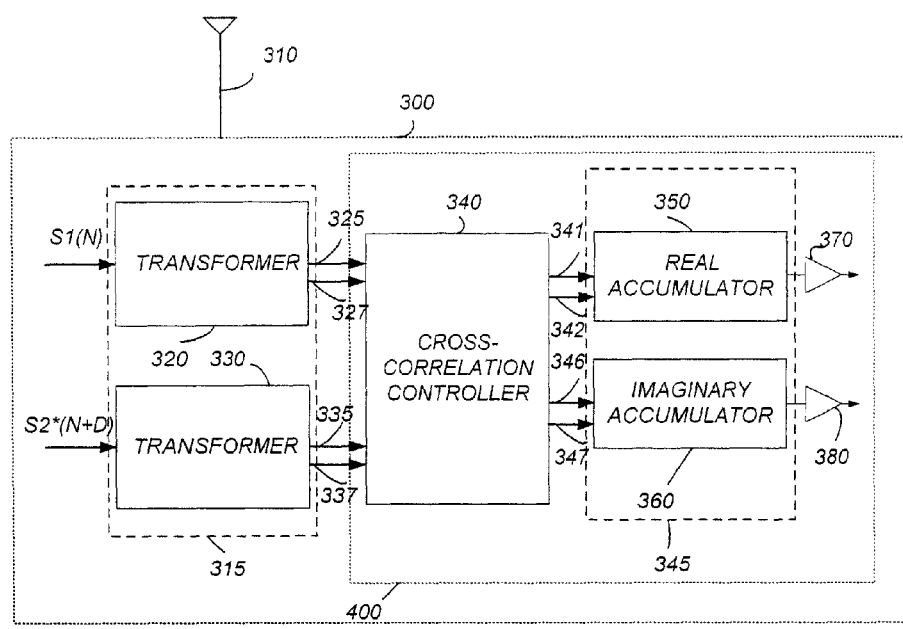
FIG. 3 is a schematic diagram of a receiver according to some exemplary embodiments of the present invention.

Turning to FIG. 3, a block diagram of a receiver 300 according to an embodiment of the present invention is shown. Although, the scope of the present invention is not limited in this respect, receiver 300 may include an antenna 310, a transformation unit 315 that may include transformers 320, 330, and a cross-correlator 400. Cross-correlator 400 may include a cross-correlation controller 340, an accumulation unit 345 that may include a real accumulator 350 and an imaginary accumulator 360 and amplifiers 370, 380.

Although the scope of the present invention is not limited to this example, for simplicity of description, receiver 300 will be described as a WCDMA receiver. Antenna 310 may receive signals, for example, pilot signal, dedicated channel signal, or the like, that may include QPSK sequences. In some embodiments of the present invention antenna 310 may be a dipole antenna, if desired. However, other types of antennas may be used.

A demodulator (not shown) may output two signals, S1(N) and S2*(N+D), of QPSK sequences. Transformers 320 and 330 may receive signals S1(N) and S2*(N+D) of the QPSK sequences and may transform the QPSK sequences into two signals of complex binary sequences $\tilde{S}_1(n)$ and $\tilde{S}_2^*(n)$, respectively. The transformation of QPSK sequences to com- $$\tilde{S}_1(n+i) \cdot \tilde{S}_2^*(n+i+d) = \begin{cases} \tilde{S}_{1I}(n+i) \cdot \tilde{S}_{2I}(n+i+d) & S_{1I}(n+i) = S_{1Q}(n+i), S_{2I}(n+i+d) = S_{2Q}(n+i+d) \\ -j \cdot \tilde{S}_{1I}(n+i) \cdot \tilde{S}_{2Q}(n+i+d) & S_{1I}(n+i) = S_{1Q}(n+i), S_{2I}(n+i+d) \neq S_{2Q}(n+i+d) \\ j \cdot \tilde{S}_{1Q}(n+i) \cdot \tilde{S}_{2I}(n+i+d) & S_{1I}(n+i) \neq S_{1Q}(n+i), S_{2I}(n+i+d) = S_{2Q}(n+i+d) \\ \tilde{S}_{1Q}(n+i) \cdot \tilde{S}_{2Q}(n+i+d) & S_{1I}(n+i) \neq S_{1Q}(n+i), S_{2I}(n+i+d) \neq S_{2Q}(n+i+d) \end{cases} \quad \text{Equation 4}$$

plex binary sequences may be performed by ±(π/4) phase rotation of the QPSK sequences, as described in detail with reference to FIG. 2 above. Furthermore, transformers 320 and 330 may provide control bits such as, for example, sign bits 325 and 335 and type bits 327 and 337, to cross-correlation controller 340.

Although the scope of the present invention is not limited in this respect, cross-correlation controller 340 may provide complex binary sequences via ports 341, 346 and may enable or disable accumulators 350, 370 with ports 342, 347, respectively. More particularly, cross-correlation controller 340 may selectively control which accumulator may be active, using enable signals via ports 342, 347, according to sign bits 325, 335 and type bits 327, 337. An example of such a selective control is described with reference to Table 1 below.

Although the scope of the present invention is not limited in this respect, in some embodiments of the present invention, a representation as shown in Table 1 below may be stored in a memory (not shown). In addition, in other embodiments of the present invention, a representation as shown in Table 1 below may be implemented by hardware and/or by software.

TABLE 1

| Index | Sign Bit (325) | Sign Bit (335) | Type Bit (327) | Type Bit (337) | Real Accumulator (350) | | Image Accumulator (360) | |
|---|---|---|---|---|---|---|---|---|
| | | | | | Input | Enable | Input | Enable |
| 0 | Plus | Plus | Real | Real | A | On | — | Off |
| 1 | Plus | Plus | Real | Image | — | Off | A | On |
| 2 | Plus | Plus | Image | Real | — | Off | A | On |
| 3 | Plus | Plus | Image | Image | -A | On | — | Off |
| 4 | Plus | Minus | Real | Real | -A | On | — | Off |
| 5 | Plus | Minus | Real | Image | — | Off | -A | On |
| 6 | Plus | Minus | Image | Real | — | Off | -A | On |
| 7 | Plus | Minus | Image | Image | A | On | — | Off |
| 8 | Minus | Plus | Real | Real | -A | On | — | Off |
| 9 | Minus | Plus | Real | Image | — | Off | -A | On |
| 10 | Minus | Plus | Image | Real | — | Off | -A | On |
| 11 | Minus | Plus | Image | Image | A | On | — | Off |
| 12 | Minus | Minus | Real | Real | A | On | — | Off |
| 13 | Minus | Minus | Real | Image | — | Off | A | On |
| 14 | Minus | Minus | Image | Real | — | Off | A | On |
| 15 | Minus | Minus | Image | Image | -A | On | — | Off |

In Table 1 the following notation used:
"Index" represents indices of the complex binary sequence;
"Sign Bits" (325, 335) represent the sign of the transformed sequence;
"Type Bits" (335, 337) represent weather the transformed bit of the complex binary sequence is "Real" or "Image" (i.e., imaginary);
"Input" represent which binary sequence may be provided to which of the accumulators; and
"Enable" represents whether or not the accumulator is enabled by the enable bit.

Although the scope of the present invention is not limited in this respect, cross-correlation controller 340 may select the complex binary sequences according to Table 1. The selected sequences may be inputted to the selected accumulators 350 and/or 360, to be accumulated. Real accumulator 350 and imaginary accumulator 360 may produce the total Real/Image cross correlation results, respectively.

In addition, accumulators 350 and 360 may include an up/down counter and an AND gate (not shown). The AND gate may enable the up/down counter operation. However, it should be understood that other accumulator implementations may be used. Although, the scope of the present invention is not limited in this respect, multipliers 370, 380 may multiply the results of cross-correlation preformed by cross-correlation controller 340, real accumulator 350 and imaginary accumulator 360 by two, as depicted by Equation 2.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus comprising:
one or more antennas configured to receive signals transmitted over a cellular telecommunications network;
a demodulator configured to (i) demodulate signals received by the one or more antennas, and (ii) generate a first input signal and a second input signal;
a transformation unit configured to (i) rotate a phase of phase shift keying (PSK) sequences of the first input signal by one of +π/4 and −π/4 to generate a first signal of complex sequences, (ii) rotate a phase of PSK sequences of the second input signal by one of +π/4 and −π/4 to generate a second signal of complex sequences, and (iii) based on the first signal of complex sequences and the second signal of complex sequences, generate (A) one or more sign bits and (B) one or more type bits, wherein the one or more sign bits comprise (i) a first sign bit generated based on a sign of the first signal of complex sequences, and (ii) a second sign bit generated based on a sign of the second signal of complex sequences, and
wherein the one or more type bits comprise (i) a first type bit generated based on whether the first signal of complex sequences has real component or imaginary component, and (ii) a second type bit generated based on whether the second signal of complex sequences has real component or imaginary component; and
a cross-correlator configured to cross-correlate the first signal of complex sequences and the second first signal of complex sequences.

2. The apparatus of claim 1, wherein the transformation unit is configured to rotate the phase of the PSK sequences of the first input signal and the second input signal, the PSK sequences being quardrature phase shift keying (QPSK) sequences.

3. The apparatus of claim 1, wherein the transformation unit is configured to generate the first signal of complex sequences and the second signal of complex sequences, the complex sequences being complex binary sequences.

4. The apparatus of claim 1, wherein the apparatus is a cellular receiver for use in the cellular telecommunications network.

5. An apparatus comprising:
one or more antennas configured to receive signals transmitted over a cellular telecommunications network;
a demodulator configured to (i) demodulate signals received by the one or more antennas, and (ii) generate a first input signal and a second input signal;
a transformation unit configured to (i) rotate a phase of phase shift keying (PSK) sequences of the first input signal by one of +π/4 and −π/4 to generate a first signal of complex sequences, (ii) rotate a phase of PSK sequences of the second input signal by one of +π/4 and −π/4 to generate a second signal of complex sequences, and (iii) based on the first signal of complex sequences and the second signal of complex sequences, generate (A) one or more sign bits and (B) one or more type bits; and a cross-correlator configured to cross-correlate the first signal of complex sequences and the second first signal of complex sequences, wherein the cross-correlator comprises:
a cross-correlation controller configured to
receive the one or more sign bits and the one or more type bits, and
based on the one or more sign bits and the one or more type bits, selectively provide (i) real components associated with the first signal of complex sequences and the second signal of complex sequences to a first accumulator, and (ii) imaginary components associated with the first signal of complex sequences and the second signal of complex sequences to a second accumulator, and
an accumulation unit comprising
the first accumulator configured to (i) receive the real components associated with the first signal of complex sequences and the second signal of complex sequences to the first accumulator, and (ii) generate a real cross-correlated signal, and
the second accumulator configured to (i) receive the imaginary components associated with the first signal of complex sequences and the second signal of complex sequences to the first accumulator, and (ii) generate an imaginary cross-correlated signal.

6. The apparatus of claim 5, wherein the cross-correlation controller is further configured to:
selectively activate, at any given time, any one of the first accumulator and the second accumulator.

7. The apparatus of claim 6, wherein:
the transformation unit is further configured to, based on the first signal of complex sequences and the second signal of complex sequences, generate (i) one or more sign bits and (ii) one or more type bits; and
the cross-correlation controller is configured to, based on (i) the one or more sign bits and (ii) the one or more type bits, selectively activate any one of the first accumulator and the second accumulator.

8. The apparatus of claim 5, wherein the cross-correlator further includes:
a first multiplier configured to multiply the real cross-correlated signal by a first multiplication factor; and
a second multiplier configured to multiply the imaginary cross-correlated signal by a second multiplication factor.

9. The apparatus of claim 8, wherein:
the first multiplier is configured to multiply the real cross-correlated signal by the first multiplication factor such that first multiplication factor is two; and
the second multiplier is configured to multiply the imaginary cross-correlated signal by the second multiplication factor such that second multiplication factor is two.

10. A method comprising:
receiving, by one or more antennas, signals transmitted over a cellular telecommunications network;
demodulating signals received by the one or more antennas to generate a first input signal and a second input signal;
rotating a phase of phase shift keying (PSK) sequences of the first input signal by one of $+\pi/4$ and $-\pi/4$ to generate a first signal of complex sequences;
rotating a phase of PSK sequences of the second input signal by one of $+\pi/4$ and $-\pi/4$ to generate a second signal of complex sequences;
based on the first signal of complex sequences and the second signal of complex sequences, generating (i) one or more sign bits and (ii) one or more type bits such that the one or more sign bits comprises (i) a first sign bit generated based on a sign of the first signal of complex sequences, and (ii) a second sign bit generated based on a sign of the second signal of complex sequences, and
the one or more type bits comprises (i) a first type bit generated based on whether the first signal of complex sequences has real component or imaginary component, and (ii) a second type bit generated based on whether the second signal of complex sequences has real component or imaginary component; and
cross-correlating the first signal of complex sequences and the second first signal of complex sequences.

11. The method of claim 10, wherein rotating the phase of PSK sequences of the first input signal and the second input signal further comprises:
rotating the phase of PSK sequences of the first input signal and the second input signal, the PSK sequences being quardrature phase shift keying (QPSK) sequences.

12. A method comprising:
receiving, by one or more antennas, signals transmitted over a cellular telecommunications network;
demodulating signals received by the one or more antennas to generate a first input signal and a second input signal;
rotating a phase of phase shift keying (PSK) sequences of the first input signal by one of $+\pi/4$ and $-\pi/4$ to generate a first signal of complex sequences;
rotating a phase of PSK sequences of the second input signal by one of $+\pi/4$ and $-\pi/4$ to generate a second signal of complex sequences; and
cross-correlating the first signal of complex sequences and the second first signal of complex sequences, wherein cross-correlating the first signal of complex sequences and the second first signal of complex sequences comprises:
providing (i) real components associated with the first signal of complex sequences and the second signal of complex sequences to a first accumulator, and (ii) imaginary components associated with the first signal of complex sequences and the second signal of complex sequences to a second accumulator,
accumulating, by the first accumulator, the real components of the first signal of complex sequences and the second signal of complex sequences to generate a real cross-correlated signal, and
accumulating, by the second accumulator, the imaginary components of the first signal of complex sequences and the second signal of complex sequences to generate an imaginary cross-correlated signal.

13. The method of claim 12, further comprising:
based on the first signal of complex sequences and the second signal of complex sequences, generating (i) one or more sign bits and (ii) one or more type bits; and
based on (i) the one or more sign bits and (ii) the one or more type bits, selectively activating, at any given time, any one of the first accumulator and the second accumulator.

14. The method of claim 12, further comprising:
multiplying (i) the real cross-correlated signal by a first multiplication factor, and (ii) the imaginary cross-correlated signal by a second multiplication factor.

15. The method of claim 12, further comprising:
multiplying (i) the real cross-correlated signal by a first multiplication factor, the first multiplication factor being two, and (ii) the imaginary cross-correlated signal by a second multiplication factor, the second multiplication factor being two.

\* \* \* \* \*